(12) United States Patent
Romagnano et al.

(10) Patent No.: US 7,851,029 B2
(45) Date of Patent: Dec. 14, 2010

(54) PHOTOPOLYMERISABLE SYSTEMS CONTAINING LOW-EXTRACTABLE AND LOW-VOLATILE COINITIATORS

(75) Inventors: Stefano Romagnano, Lainate (IT); Angelo Casiraghi, Milan (IT); Marco Visconti, Varese (IT); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 491 days.

(21) Appl. No.: 11/997,934

(22) PCT Filed: May 10, 2006

(86) PCT No.: PCT/EP2006/062213

§ 371 (c)(1), (2), (4) Date: Feb. 5, 2008

(87) PCT Pub. No.: WO2007/017298

PCT Pub. Date: Feb. 15, 2007

(65) Prior Publication Data

US 2008/0213502 A1    Sep. 4, 2008

(30) Foreign Application Priority Data

Aug. 5, 2005    (IT) .......................... VA2005A0049

(51) Int. Cl.
*B05D 3/06*   (2006.01)
(52) U.S. Cl. ...................... 427/508; 427/517; 427/519
(58) Field of Classification Search .................... None
See application file for complete search history.

(56) References Cited

U.S. PATENT DOCUMENTS

| | | | |
|---|---|---|---|
| 4,525,256 A * | 6/1985 | Martin | 522/14 |
| 6,492,514 B1 * | 12/2002 | Meneguzzo et al. | 544/158 |
| 6,733,847 B2 * | 5/2004 | Kunz et al. | 427/533 |
| 7,396,861 B2 * | 7/2008 | Loccufier et al. | 522/35 |

* cited by examiner

*Primary Examiner*—Erma Cameron
(74) *Attorney, Agent, or Firm*—Mossman, Kumar & Tyler, PC

(57) ABSTRACT

This invention concerns photopolymerizable systems containing ethylenically unsaturated reactive oligomers and/or monomers comprising at least one photoinitiator and at least one coinitiator having low-extractability and low-volatility; the photopolymerizable systems of the invention are particularly suited for the preparation of food-packaging coatings.

18 Claims, No Drawings

PHOTOPOLYMERISABLE SYSTEMS CONTAINING LOW-EXTRACTABLE AND LOW-VOLATILE COINITIATORS

This invention concerns photopolymerisable systems containing coinitiators having low-extractability and low-volatility.

Photopolymerisable systems contain photoinitiators characterised by the presence within their molecule of a functional group that, by electromagnetic excitation, generally UV radiation, generates radicals that are able to start a polymerisation process.

Some processes involving the photochemical generation of radicals depend on the presence of coinitiators.

In the present text, with the term coinitiator we mean a molecule that, by absorption of UV radiation, does not generate itself active radicals, but cooperates with the photoinitiator in originating active radical species or acts itself as oxygen-inhibitor.

As it is known, photoinitiators, coinitiators and radicals must follow some restrictive precondition like low toxicity, low extractability, low volatility and low odour and must be highly compatible with the photopolymerisable system.

These properties are very important in coatings and printing inks for food-packaging, that are subject to particular restrictions concerning the quantity of substances that can be extracted from the packaging itself.

Contamination by this substances is not allowed by the present legislative regulations and can also modify the organoleptic characteristics of food.

The most commonly used coinitiators are alkyl-amine systems like, for example, methyldiethanolamine, ethyl-4-dimethyl-aminobenzoate and other similar systems.

These compounds give some problems before and after polymerisation because of their high volatility and their tendency to migrate, that persists after polymerisation.

We have now found that coinitiators of formula I

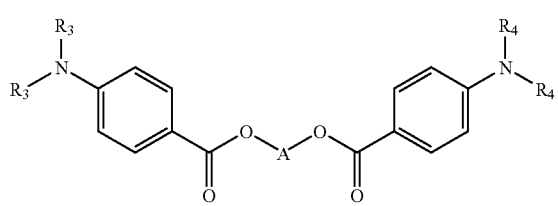

wherein

A is $(CH_2CH_2NR_1)_nCH_2CH_2$, and $R_1$ can be linear or branched $C_1$-$C_{12}$ alkyl, alkoxyl, or hydroxyethyl;

$R_3$ and $R_4$ are independently of one another linear or branched $C_1$-$C_4$ alkyl; n is between 1 and 10, exhibit low-extractability, low-volatility, together with a good reactivity and excellent characteristics in terms of white and yellow index.

Photopolymerisable systems containing reactive ethylenically unsaturated oligomers and/or monomers, at least one coinitiator of formula I and at least one photoinitiator are therefore a fundamental object of this invention.

Photoinitiators which are suitable for the realisation of this invention are photoinitiators reacting by homolytic cleavage or hydrogen transfer mechanism and are benzophenones, ketosulphones, thioxanthones, 1,2-diketones, anthraquinones, fluorenones and xanthones, acetophenone derivatives (like α-hydroxyacetophenones, α-aminoacetophenones, α-hydroxycycloalkyl-phenyl-ketones, dialkoxyacetophenones, benzoin ethers, benzyl ketals, phenylglyoxylates, mono- and bis-acylphosphine oxides.

In particular, among the photoinitiators useful for this invention we cite:

within benzophenones: 2-methylbenzophenone, 3-methylbenzophenone, 4-methylbenzophenone, 2,4,6-trimethylbenzophenone, mixtures of methylbenzophenone and 2,4,6-trimethyl benzophenone, linearyl benzophenone, methyl o-benzoylbenzoate, 4-phenylbenzophenone, 4-(4-methylphenylthio)-benzophenone, 4,4'-dimethylamino-benzophenone, 4,4'-diethylamino-benzophenone;

within thioxanthones: 2-isopropyl-thioxanthone, mixture of 2- and 4-isopropylthioxanthone, 2,4-diethyl-thioxanthone, 2-chloro-thioxanthone, 1-chloro-4-n-propyloxythioxanthone, thioxanthone;

within ketosulphones: 1-[4-(4-benzoyl-phenylsulphanyl)-phenyl]-2-methyl-2-(toluene-4-sulphanyl)-propane-1-one;

within 1,2-diketones: benzyl, 1,2-camphoroquinone within anthraquinones: 2-ethyl-anthraquinone;

within xanthones: xanthone;

within acetophenones: oligo-[2-hydroxy-2-methyl-1-[4-(1-methylvinyl)phenyl]-propanone], 2-hydroxy-2-methyl-1-phenyl-propanone, 2-hydroxy-1-[4-(2-hydroxy-ethoxy)-phenyl]-2-methyl-propan-1-one, 2-dimethylamino-2-(4-methylbenzyl)-1-(4-morpholine-4-yl-phenyl)-butan-1-one, 2-benzyl-2-dimethylamino-1-(3,4-dimethoxy-phenyl)-butan-1-one, 2-benzyl-2-dimethylamino-1-(4-morpholine-4-yl-phenyl)-butan-1-one, 2-methyl-1-(4-methylsulphanyl-phenyl)-2-morpholine-4-yl-propan-1-one, 1-[2,3-dihydro-1-[4-(2-hydroxy-2-methyl-1-oxopropyl)phenyl]-1,3,3-trimethyl-1H-inden-5-yl]-2-hydroxy-2-methyl-1-propanone, 1-[2,3-dihydro-3-[4-(2-hydroxy-2-methyl-1-oxopropyl)phenyl]-1,1,3-trimethyl-1H-inden-5-yl]-2-hydroxy-2-methyl-1-propanone, 4,3'-bis(α-hydroxy-isobutiryl)-diphenylmethane, 4,4'-bis(α-hydroxy-isobutiryl)-diphenylmethane, 4,4'-bis(α-hydroxy-isobutiryl)-diphenylether, benzyl dimethyl ketal;

within phenylglyoxylates: methylphenylglyoxylate, ethyl ester of the 2-(2-oxo-2-phenyl-acetoxy-ethoxyethyl)oxyphenylacetic acid, methyl ester of [4-(4-methoxyoxallyl-phenoxy)-phenyl]-oxo-acetic acid;

within monoacylphosphine oxides and bisacylphosphine oxides: (2,4,6-trimethylbenzoyl)-diphenyl-phosphine oxide, ethyl ester of phenyl-(2,4,6-trimethylbenzoyl)-phosphinic acid, bis(2,6-dimethoxybenzoyl)-(2,4,4-trimethyl-pent-1-yl) phosphine oxide, bis(2,4,6-trimethyl benzoyl)-phenyl-phosphine oxide, bis(2,4,6-trimethyl benzoyl)-(2,4-dipentoxyphenyl)phosphine oxide).

The photopolymerisable systems of the present invention are in particular suitable for the preparation of coatings for food-packaging.

Due to their high reactivity, the preferred coinitiators of the invention are coinitiators of formula I wherein A is $CH_2CH_2N(CH_3)CH_2CH_2$ or $CH_2CH_2N(CH_2CH_2OH)CH_2CH_2$ and $R_3$ and $R_4$ are methyl or ethyl.

The coinitiators of formula I can be prepared by methods which are well known by the man skilled in the art, in particular by acid catalysed reaction of 4-dimethylamino benzoic acid or its correspondent acyl chloride in the presence of a base, such as pyridine or triethylamine, with a diol like methyldiethanolamine, or with a glycol like triethanolamine; or from a salt of 4-dimethylaminobenzoic acid by reaction with the correspondent alkyl bromide, tosylate or mesylate; or by transesterification of 4-dimethylaminobenzoic acid ethyl ester under acid or basic catalysis with the diols and glycols listed above (cfr. Journal of Macromolecular Science. Chemistry A12 (5), 661-669).

It is a further object of the present invention a process for preparing coatings for metal, wood, paper and plastic surfaces characterised by applying to the surface a photopolymerisable system containing reactive ethylenically unsaturated monomers or/and oligomers, at least one coinitiator of formula I and at least one photoinitiator of the benzophenone, ketosulphone, thioxantone, 1,2-diketone, anthraquinone, fluorenone, xanthone, acetophenone, phenylglioxylate, monoacylphosphine oxide or bisacylphosphine oxide family, in such a quantity to obtain, after polymerisation, a coating having a thickness between 0.5 and 100 microns; photopolymerising with UV and/or visible light.

The term "photopolymerisation" is used in its broad sense and includes the polymerisation or cross-linking of polymeric material, for example of prepolymers, the homopolymerisation and copolymerisation of monomers and the combination of these reactions.

The monomers that can be used in the above described system include, for example: acrylonitrile, acrylamide and its derivatives, vinyl ethers, N-vinylpirrolidone, mono and polyfunctional allyl ethers like for example trimethylolpropane diallyl ether, styrenes and α-methyl styrene, esters of acrylic and methacrylic acid with aliphatic alcohols, with glycols, with polyhydroxylated compounds like, for example, penthaeritritol, trimethylolpropane, esters of vinyl alcohol with aliphatic or acrylic acids, derivatives of fumaric and maleic acid.

Oligomers which are useful for this invention include, for example, polyacrylates, polyurethanes, epoxidic resins, polyethers with acrylic, maleic or fumaric functionalities.

The photopolymerisable systems of the present invention may contain other photoinitiators like, e.g., trisacylphosphine oxide, halogenomethyltriazine, ferrocene or titanocene compounds, photoinitiators containing borate or O-acyloximic group.

The photoinitiators represent from 0.01 to 20% w/w, preferably from 0.5 to 10% w/w, more preferably from 1 to 5% w/w of the photopolymerisable system of the present invention.

The photopolymerisable system may contain other ingredients, e.g. thermal stabilisers, sensitisers, photo-oxidation stabilisers like sterically hindered amines, antioxidants, oxygen-inhibitors, thermal generators of radicals, like organic and inorganic peroxides, peresters, hydroperoxides, benzopinacoles, azoderivatives such as azodiisobutironytrile, metal compounds like cobalt(II) and manganese salts, antifoaming agents, fillers, dispersants, pigments, dyes and/or matting agents, other additive of general use, dispersed solids, glass and carbon fibres, thixotropic agents.

Other ingredients that can be contained in the photopolymerisable system are non-photopolymerisable polymers, present as chemically inert substances, like e.g. nitrocellulose, polyacrylic esters, polyolefin, etc., or polymers which can be crosslinked by other systems, like peroxide or atmospheric oxygen or by acid catalysis or by thermal activation, like e.g. polyisocyanates, urea, melamine or epoxidic resins.

The coinitiators of formula I are normally used in the photopolymerisable system in a quantity between 0.01 and 20% w/w, preferably between 0.5 and 10% w/w, more preferably between 1 and 5% w/w, referring to the total weight of the system.

Photoinitiators of formula I are suited both for clear and pigmented photopolymerisable systems, and are useful, for example, even for the preparation of photocurable inks.

Because of the low extractability and volatility of the coinitiators, the photopolymerisable systems of this invention are particularly useful for photopolymerisable inks utilisable in food-packaging.

Some examples of light sources that are useful for photopolymerisation of photopolymerisable systems of the invention are mercury or superactinic or excimer lamps, emitting in the UV-visible region.

Within the light sources that can be used for the present invention, sun light and other artificial sources emitting electromagnetic radiation having a wavelength between 180 nm and the IR zone are included.

Some examples of the preparation of coinitiators of formula I and of photopolymerisable systems of the invention are here reported to illustrate, and not to limit, the invention.

EXAMPLE 1

Preparation of Coinitiator Id Having Formula

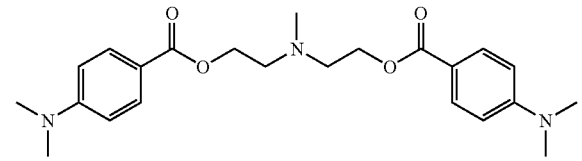

3.75 ml (45.5 mmol) of triethylamine were added dropwise, at room temperature, to a solution of 2.94 g (16.0 mmol) of 4-dimethylaminobenzoychloride and 0.92 g (7.7 mmol) of N-methyldiethanolamine in dichloromethane. After stirring for 30' at room temperature the solution was washed with water. The organic phase was separated, dried on $Na_2SO_4$ and evaporated under vacuum. The obtained oil was treated with 40 ml of methanol and crystallised.

The solution was filtered off and the filter cake was oven dried at 40° C. 2.02 g of white solid were obtained. (Coinitiator Id)

Yield 61%

Melting point: 89-91° C.

$^1$H-NMR-300 MHz, (CDCl$_3$), δ ppm: 7.90, d, 4H, 6.62, d, 4H, 4.4, m, 4H, 3.02, s, 12H, 2.95, m, 4H, 2.48, s, 3H

EXAMPLE 2

Preparation of Coinitiator Ie Having Formula

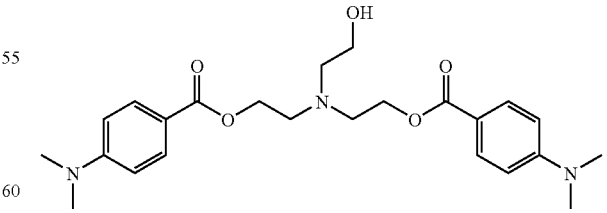

3 g (16.3 mmol) of 4-dimethylaminobenzoylchloride were added, portionwise in 20 minutes, to a solution of 1.21 g (8.1 mmol) of triethylamine in 100 ml of dichloromethane. The solution was stirred overnight, washed with water, dried on $Na_2SO_4$ and evaporated under vacuum. The raw product was purified by flash chromatography eluting with a mixture of dichloromethane/MeOH 98/2.

The product was isolated as an oil. (Coinitiator Ie)

$^1$H-NMR-300 MHz, (CDCl$_3$), δ ppm: 7.88, d, 4H, 6.58, d, 4H, 4.38, t, 4H, 3.6, t, 2H, 3.04, m, 16H, 2.82, t, 2H Application Tests.

The substances used for the preparation of photopolymerisable systems evaluated in the following application tests are:

Ebecryl® 600 (epoxy acrylate by UCB, Belgium);
Ebecryl® 220 (aromatic polyurethane by UCB, Belgium);
Ebecryl® 350 (slip agent by UCB, Belgium);
TMPTA (trimethylolpropane triacrylate);
TPGDA (tripropyleneglycol diacrylate);
OTA 480® (trifunctional acrylated oligomer derived from glicerol, from UCB, Belgium).

The Coinitiators Id and Ie synthesised as described in the Examples 1 and 2 were used as coinitiators and Esacure® 1001 (ketosulphone from Lamberti SpA) was used as photoinitiator.

A matrix for photopolymerisable systems (M1) was prepared mixing (w/w):

| | |
|---|---|
| Ebecryl (R) 600 | 40% |
| TMPTA | 30% |
| OTA 480 (R) | 30% |

The photopolymerisable systems to be evaluated are then prepared; their composition is reported in the following table (Table 1).

TABLE 1

Composition (w/w) of the photopolymerisable systems

| | X* | D | E |
|---|---|---|---|
| Matrix M1 | 97 | 94 | 94 |
| Esacure 1001 | 3 | 3 | 3 |
| Coinitiator Id | | 3 | |
| Coinitiator Ie | | | 3 |

*comparative

The evaluation of the photopolymerisable systems is made by determining the reactivity parameters, yellow index and white index.

Reactivity

The photopolymerisable system was laid with a thickness of 50 microns on a varnished cardboard using a bar-coater mounted on an electric stretch-film and thereafter irradiated at a distance of 26 cm from the light source. A Fusion® photopolymerisator was used, equipped with a medium pressure mercury lamp with a power of 120 W/cm.

The photopolymerisation speed, measured in m/min, is the maximum possible speed that results in perfect superficial crosslinking of the system ("tack free").

The maximum speed (expressed in m/min) resulting in a surface resistant to any visible damage after rubbing with abrasive paper was also measured (superficial abrasion).

The greater is the maximum speed, the greater the efficiency of the system.

The obtained results are reported in Table 2

TABLE 2

Reactivity

| | X* | D | E |
|---|---|---|---|
| Tack-free (m/min) | 8 | 38 | 36.2 |
| Superficial abrasion (m/min) | 5 | 20 | 16.5 |

*comparative

The comparison of the photopolymerisable system X with the systems D and E shows the high activity of the products of the invention as coinitiators.

White and Yellow Index

The photopolymerisable system was laid with a thickness of 50 microns on a varnished cardboard using a bar-coater mounted on an electric stretch-film and thereafter is passed to a distance of 26 cm from the light source at a speed corresponding to 70% of the tack-free speed. A Fusion® photopolymerisator was used, equipped with a medium pressure mercury lamp with a power of 120 W/cm.

White and yellow indexes were measured according to ASTM D1925-70 standard test method. A low value of yellow and a high value of white index correspond to high stability of the colour of the formulation.

The results are reported in Table 3.

TABLE 3

Yellow and white index

| | D | E |
|---|---|---|
| YI | 10.5 | 9.5 |
| WI | 55.9 | 58.3 |

Extractability

The evaluation of the extractability of the Coinitiator Id, in comparison with the reference coinitiator EDB (ethyl 4-dimethylaminobenzoate) is reported.

A matrix (M2) for photopolymerisable systems was prepared, mixing (w/w):

| | |
|---|---|
| Ebecryl (R) 600 | 38.46% |
| Ebecryl (R) 350 | 1.10% |
| Ebecryl (R) 220 | 9.89% |
| TPGDA | 50.55% |

Two photopolymerisable systems were prepared.

The EDB system of Table 4 is comparative and is made of 94% w/w of matrix M2, 3% w/w of benzophenone and 3% w/w of Esacure EDB (EDB from Lamberti SpA)

The D' system of Table 4 is made of 94% w/w of matrix M2, 3% w/w of benzophenone and 3% w/w of Coinitiator Id.

The photopolymerisable systems were laid with a thickness of 6 microns on an aluminium sheet (3×3 inches) using a bar-coater mounted on an electric stretch-film and thereafter photopolymerised with a speed of 5 m/min. A Fusion® photopolymerisator was used, equipped with a medium pressure mercury lamp with a power of 160 W/cm. The photopolymerised samples were placed in glass jars containing as test liquids, 200 ml of 10% ethanol in water, or 200 ml of 3% acetic acid in water. The glass jars were closed and kept for 10 days at 40° C. After 10 days, the liquids were decanted and put in a glass dark bottle. The liquids were then analysed by HPLC (column: C18, 150×3.9 mm, 4 micron; eluent $CH_3CN/H_3PO_4$ 0.08M, 60/40, flux 1 ml/min for EDB and 90/10, flux 1.5 ml/min for Coinitiator Id; detector at 310 nm) and the quantity of the Coinitiator Id is determined.

The results are reported in Table 4.

TABLE 4

| | Extractabilty | |
|---|---|---|
| | EDB* | D' |
| EtOH 10% | 85 ppb | n.d.** |
| AcOH 3% | 45 ppb | n.d.** |

*comparative
**not detectable (<20 ppb).

It can be noted that the coinitiator of the invention was much less extracted by 10% ethanol and by 3% acetic acid than the reference coinitiator, and its extractability falls within the commonly accepted range for food packaging.

Odour Evaluation.

The photopolymerisable system D and an analogous system differing from D only in that Coinitiator D was replaced by EDB (EDB') were laid with a thickness of 50 μm on a varnished cardboard using a bar-coater mounted on an electric stretch-film and then passed at a distance of 26 cm from the light source, with a speed corresponding to 70% of the tack-free speed. A Fusion photopolymerisator was used, equipped with a medium pressure mercury lamp operating with about 50% of its nominal power (about 120 W/cm). The samples were photopolymerised to obtain a perfect crosslinking ("tack-free").

The thus obtained cardboard samples were put into closed glass jars and stored in oven for 60' minutes at 60° C.

Five people, one independently from the other, evaluated the odour of the samples, rating each photopolymerised system for odour intensity on the following scale:

| | |
|---|---|
| No odour | 0 |
| Almost imperceptible odour | 1 |
| Very slight odour | 2 |
| Slight odour | 3 |
| Intense odour | 4 |
| Very intense odour | 5 |

The odour evaluations (average of five ratings) are reported in Table 5.

TABLE 5

| | EDB'* | D |
|---|---|---|
| Odour intensity | 1 | 1 |

*comparative

The invention claimed is:

1. A photopolymerizable system containing ethylenically unsaturated reactive oligomers and/or monomers comprising at least one photoinitiator and at least one coinitiator of formula I:

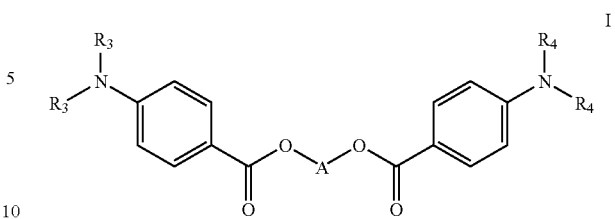

wherein A is $(CH_2CH_2NR_1)_nCH_2CH_2$; $R_1$ is linear or branched $C_1$-$C_{12}$ alkyl, alkoxyl, or hydroxyethyl; $R_3$ and $R_4$ are independently of one another linear or branched $C_1$-$C_4$ alkyl; n is between 1 and 10.

2. The photopolymerizable system of claim 1, wherein the photoinitiator is chosen from the group consisting of: benzophenones, ketosulphones, thioxanthones, 1,2-diketones, anthraquinones, fluorenones, and xanthones, acetophenone derivatives, benzoin ethers, benzyl ketals, phenylglyoxylates, mono- and bis-acylphosphine oxides, and mixtures thereof.

3. The photopolymerizable system of claim 2 wherein the acetophenone derivatives are selected from the group consisting of α-hydroxyacetophenones, α-aminoacetophenones, α-hydroxycycloalkyl-phenyl-ketones, and dialkoxyacetophenones.

4. The photopolymerizable system of claim 2 wherein the photoinitiator is selected from the group consisting of: 2-methylbenzophenone, 3-methylbenzophenone, 4-methylbenzophenone, 2,4,6-trimethylbenzophenone, mixtures of methylbenzophenone and 2,4,6-trimethylbenzophenone, linearyl benzophenone, methyl o-benzoylbenzoate, 4-phenylbenzophenone, 4-(4-methylphenylthio)-benzophenone, 4,4'-dimethylamino-benzophenone, 4,4'-diethylamino-benzophenone; 2-isopropyl-thioxanthone, mixture of 2- and 4-isopropylthioxanthone, 2,4-diethyl-thioxanthone, 2-chloro-thioxanthone, 1-chloro-4-n-propyloxythioxanthone, thioxanthone, 1-[4-(4-benzoyl-phenylsulphanyl)-phenyl]-2-methyl-2-(toluene-4-sulphanyl)-propane-1-one, benzyl, 1,2-camphoroquinone, 2-ethyl-anthraquinone, xanthone, oligo-[2-hydroxy-2-methyl-1-[4-(1-methylvinyl)phenyl]-propanone], 2-hydroxy-2-methyl-1-phenyl-propanone, 2-hydroxy-1-[4-(2-hydroxy-ethoxy)-phenyl]-2-methyl-propan-1-one, 2-dimethylamino-2-(4-methylbenzyl)-1-(4-morpholine-4-yl-phenyl)-butan-1-one, 2-benzyl-2-dimethylamino-1-(3,4-dimethoxy-phenyl)-butan-1-one, 2-benzyl-2-dimethylamino-1-(4-morpholine-4-yl-phenyl)-butan-1-one, 2-methyl-1-(4-methylsulphanyl-phenyl)-2-morpholine-4-yl-propan-1-one, 1-[2,3-dihydro-1-[4-(2-hydroxy-2-methyl-1-oxopropyl)phenyl]-1,3,3-trimethyl-1H-inden-5-yl]-2-hydroxy-2-methyl-1-propanone, 1-[2,3-dihydro-3-[4-(2-hydroxy-2-methyl-1-oxopropyl)phenyl]-1,1,3-trimethyl-1H-inden-5-yl]-2-hydroxy-2-methyl-1-propanone, 4,3'-bis(α-hydroxy-isobutiryl)-diphenylmethane, 4,4'-bis(α-hydroxy-isobutiryl)-diphenylmethane, 4,4'-bis(α-hydroxy-isobutiryl)-diphenylether, benzyl dimethyl ketal, methylphenylglyoxylate, ethyl ester of the 2-(2-oxo-2-phenyl-acetoxy-ethoxyethyl) oxyphenylacetic acid, methyl ester of [4-(4-methoxyoxallyl-phenoxy)-phenyl]-oxo-acetic acid, (2,4,6-trimethylbenzoyl)-diphenyl-phosphine oxide, ethyl ester of phenyl-(2,4,6-trimethylbenzoyl)-phosphinic acid, bis (2,6-dimethoxybenzoyl)-(2,4,4-trimethyl-pent-1-yl)phosphine oxide, bis(2,4,6-trimethylbenzoyl)-phenyl-phosphine oxide, and bis(2,4,6-trimethylbenzoyl)-(2,4-dipentoxyphenyl)phosphine oxide).

5. The photopolymerizable system of claim 1 wherein A is $CH_2CH_2N(CH_3)CH_2CH_2$ and $R_3$ and $R_4$ are methyl or ethyl groups.

6. The photopolymerizable system of claim 2 wherein A is $CH_2CH_2N(CH_3)CH_2CH_2$ and $R_3$ and $R_4$ are methyl or ethyl groups.

7. The photopolymerizable system of claim 4 wherein A is $CH_2CH_2N(CH_3)CH_2CH_2$ and $R_3$ and $R_4$ are methyl or ethyl groups.

8. The photopolymerizable system of claim 1 wherein A is $CH_2CH_2N(CH_2CH_2OH)CH_2CH_2$ and $R_3$ and $R_4$ are methyl or ethyl groups.

9. The photopolymerizable system of claim 2 wherein A is $CH_2CH_2N(CH_2CH_2OH)CH_2CH_2$ and $R_3$ and $R_4$ are methyl or ethyl groups.

10. The photopolymerizable system of claim 4 wherein A is $CH_2CH_2N(CH_2CH_2OH)CH_2CH_2$ and $R_3$ and $R_4$ are methyl or ethyl groups.

11. A compound having the general formula I:

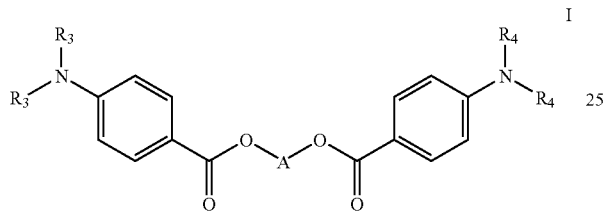

wherein A is $(CH_2CH_2NR_1)_nCH_2CH_2$; $R_1$ is linear or branched $C_1$-$C_{12}$ alkyl, alkoxyl, or hydroxyethyl; $R_3$ and $R_4$ are independently of one another linear or branched $C_1$-$C_4$ alkyl; n is between 1 and 10.

12. The compound of claim 11 wherein A is $CH_2CH_2N(CH_3)CH_2CH_2$ and $R_3$ and $R_4$ are methyl or ethyl groups.

13. The compound of claim 11 wherein A is $CH_2CH_2N(CH_2CH_2OH)CH_2CH_2$ and $R_3$ and $R_4$ are methyl or ethyl groups.

14. A process for coating surfaces comprising:
applying to a surface a photopolymerizable system comprising
reactive ethylenically unsaturated monomers and/or oligomers;
at least one coinitiator of having the general formula

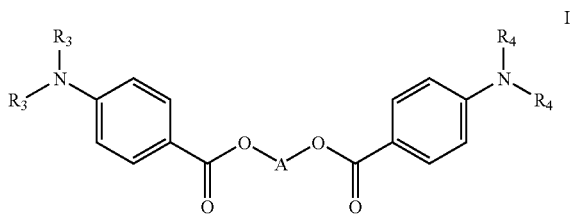

wherein A is $(CH_2CH_2NR_1)_nCH_2CH_2$; $R_1$ is linear or branched $C_1$-$C_{12}$ alkyl, alkoxyl, or hydroxyethyl; $R_3$ and $R_4$ are independently of one another linear or branched $C_1$-$C_4$ alkyl; n is between 1 and 10; and at least one photoinitiator selected from the group consisting of:
benzophenones, ketosulphones, thioxantones, 1,2-diketones, anthraquinones, fluorenones, xanthones, acetophenones, phenylglyoxylates, monoacylphosphine oxides, bisacylphosphine oxides, and mixtures thereof, in a quantity sufficient to obtain, after polymerization, a coating having a thickness of from about 0.5 to about 100 microns; and photopolymerizing the photopolymerizable system with UV and/or visible light.

15. The process of claim 14 wherein the surface comprises metal, wood, paper, plastic, and combinations thereof.

16. The process of claim 14 wherein A is $CH_2CH_2N(CH_3)CH_2CH_2$ and $R_3$ and $R_4$ are methyl or ethyl groups.

17. The process of claim 14 wherein A is $CH_2CH_2N(CH_2CH_2OH)CH_2CH_2$ and $R_3$ and $R_4$ are methyl or ethyl groups.

18. A photopolymerizable ink comprising a photopolymerizable system of claim 1.

* * * * *